United States Patent
Bedard et al.

(10) Patent No.: US 11,143,865 B1
(45) Date of Patent: Oct. 12, 2021

(54) LENS ARRAY FOR SHIFTING PERSPECTIVE OF AN IMAGING SYSTEM

(71) Applicant: Apple Inc., Cupertino, CA (US)

(72) Inventors: Noah D. Bedard, Pacifica, CA (US); Branko Petljanski, San Jose, CA (US); Kathrin Berkner Cieslicki, Los Altos, CA (US); Ricardo J. Motta, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 16/210,909

(22) Filed: Dec. 5, 2018

Related U.S. Application Data

(60) Provisional application No. 62/594,872, filed on Dec. 5, 2017.

(51) Int. Cl.
G02B 27/00 (2006.01)
G06K 9/00 (2006.01)
G06T 19/00 (2011.01)

(52) U.S. Cl.
CPC ..... G02B 27/0081 (2013.01); G06K 9/00671 (2013.01); G06T 19/006 (2013.01)

(58) Field of Classification Search
CPC ........ G02B 27/0172; G02B 2027/0178; G02B 27/0176; G02B 27/0101;
(Continued)

(56) References Cited

U.S. PATENT DOCUMENTS

| 2009/0140131 A1* | 6/2009 | Utagawa | H04N 9/04557 250/226 |
| 2015/0049167 A1* | 2/2015 | Suzuki | H04N 5/2258 348/45 |

(Continued)

OTHER PUBLICATIONS

Fast fabrication of curved microlens array using DMD-based lithography, Zhimin Zhang ,AIP Advances 6, 015319 (2016); https://doi.org/10.1063/1.4941356, Submitted: Dec. 22, 2015; Accepted: Jan. 22, 2016; Published Online: Jan. 29, 2016 (Year: 2016).*

(Continued)

Primary Examiner — William R Alexander
Assistant Examiner — Sharrief I Broome
(74) Attorney, Agent, or Firm — Blank Rome LLP

(57) ABSTRACT

This disclosure describes a novel lens system having an entrance pupil at a location matching, or nearly matching, the eye's optical system entrance pupil. The described lens system is significantly thinner than a single-aperture lens with matched entrance pupil and is achieved by using an array of camera elements. Each camera element contains camera optics called "lenslets" and a sensor (e.g., an image or depth sensor), where a lenslet can include one or more lens elements (e.g., a compound lens). Individual camera elements can be arranged such that THEIR optical axes intersect at, or near, the eye's entrance pupil location. In addition, each camera element's field-of-view (FOV) corresponds to a small sector of a large FOV. The FOVs of adjacent camera elements can be non- or slightly-overlapping so that a wide-angle image can be formed by concatenation of the individual camera element images.

23 Claims, 9 Drawing Sheets

(58) Field of Classification Search
CPC .... G02B 2027/0118; G02B 2017/0138; G02B 27/017; G02B 2027/014; G02B 27/0093; G02B 5/30; G02B 2027/015; G02B 27/01; G02B 27/0149; G02B 2027/0123; G02B 2027/0154; G02B 2027/013; G02B 2027/0127; G02B 2027/0159; G02B 2027/011; G02B 2027/0169; G06T 19/006; G06T 2207/10028; G06T 2219/016; G06T 7/529; G06T 19/20; G06T 3/20; G06T 5/00; G06T 5/006; G06F 3/013; G06F 3/017; G06F 1/163; G06F 3/011; G06F 3/012; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/0304; G06F 3/041; G06F 3/045; B60K 35/00; B60K 2370/1529; B60K 2370/66; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/25; B60K 2370/334; B60K 2370/52; B60K 2370/785; G06K 9/00671; G06K 9/00604; G06K 9/00691; G06K 9/00704; G06K 9/2063; G06K 9/2081; G06K 9/209; G06K 9/00597; G06K 9/00805; G02C 11/10; G02C 2200/08; G02C 5/126; G02C 5/20; G02C 7/16; G02C 1/10; G02C 2200/06; G02C 2202/20; G02C 3/02; G02C 5/143; G02C 5/146; G02C 5/16; G02C 7/04; G02C 7/086; G02C 7/101; G02C 7/102; G02C 7/12; G02C 9/04; B32B 2037/1253; B32B 2307/416; B32B 2307/42; B32B 2551/00; B32B 2551/08; B32B 37/1284; B32B 37/24; B32B 38/0008; B32B 17/061; B60R 1/00; B60R 2300/205; B60R 11/0235; B60R 11/0229; B60R 2011/0094; B60R 1/12; B60R 2001/1253; B60R 2011/0005; B60R 2011/0026; B60R 2011/0035; B60R 2011/0059; B60R 2011/008; H04N 13/344; H04N 5/332; H04N 5/33; H04N 5/64; H04N 13/122; H04N 13/194; H04N 13/239; H04N 13/275; H04N 13/279; H04N 13/30; H04N 13/332; H04N 13/349; H04N 1/6083; H04N 2213/003; H04N 5/2252; H04N 5/7491; H04N 9/3135; H04N 9/3147; H04N 9/3155; H04N 9/3161; G09G 3/3208; G09G 2310/0235; G09G 2320/0626; G09G 2340/0471; G09G 2340/0478; G09G 2360/144; G09G 3/2003; G09G 3/3225; G09G 3/3233; G09G 3/36; G09G 2300/0478; G09G 2310/08; G09G 2320/0252; G09G 2320/041; G09G 2320/10; G09G 2340/0407; G09G 3/001; G09G 3/002; G09G 3/18; G09G 3/32

See application file for complete search history.

(56) References Cited

U.S. PATENT DOCUMENTS

| | | | | |
|---|---|---|---|---|
| 2015/0254868 | A1* | 9/2015 | Srikanth | G06T 7/194 348/47 |
| 2015/0310669 | A1* | 10/2015 | Kamat | G06T 19/006 345/633 |
| 2016/0086379 | A1* | 3/2016 | Sadi | G06F 3/013 345/633 |
| 2016/0162012 | A1* | 6/2016 | Chang | G06F 1/3265 345/211 |
| 2016/0255333 | A1* | 9/2016 | Nisenzon | G06T 7/55 348/47 |
| 2017/0115489 | A1* | 4/2017 | Hu | G06T 19/006 |
| 2017/0358092 | A1* | 12/2017 | Bleibel | G06T 7/11 |

OTHER PUBLICATIONS

Bruckner, et al., "Multi-aperture optics for wafer-level cameras," J. Micro/Nanolith. MEMS MOEMS. 10(4), 2011.

R. Pericet-Camara, et al., "An artificial elementary eye with optic flow detection and compositional properties," J. R. Soc. Interface, vol. 12: 20150414, 2015.

Stollberg, et al., "The Gabor superlens as an alternative wafer-level camera approach inspired by superposition compound eyes of nocturnal insects," Optics Express, vol. 17, No. 18, Aug. 31, 2009.

Y.M. Song, et al., "Digital cameras with designs inspired by the arthropod eye," Nature 497, 95-99, 2013.

* cited by examiner

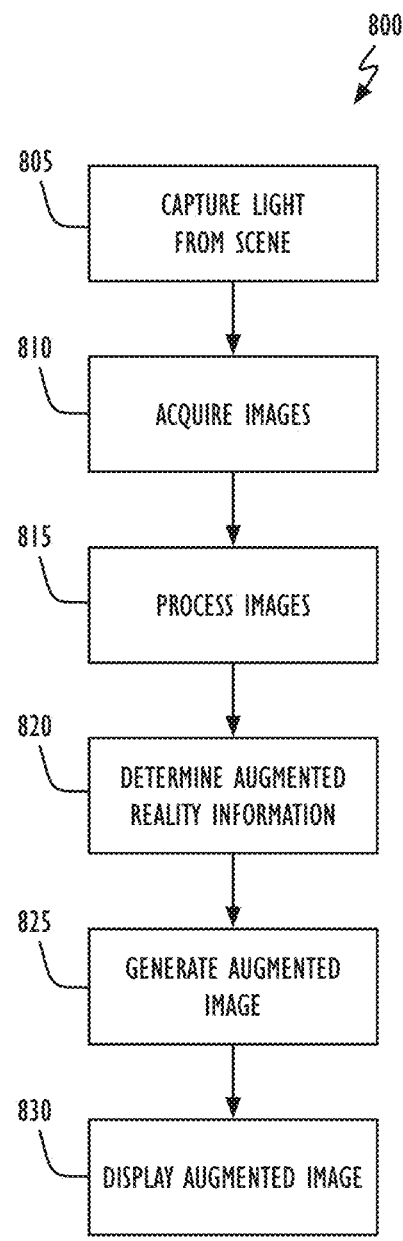

LENS ARRAY FOR SHIFTING PERSPECTIVE OF AN IMAGING SYSTEM

BACKGROUND

This disclosure relates generally to optical systems. More particularly, but not by way of limitation, this disclosure relates to a lens system design well-suited to augmented reality head-mounted devices.

Augmented reality (AR) or mixed reality (MR) systems merge virtual imagery onto a view of the real world. In AR head-mounted devices (HMDs), virtual content is displayed with an image projection system located near the eye. Real-world content can either be viewed directly using an "optical see-through" lens design, or it can be rendered digitally using scene cameras for "video see-through." Current video see-through HMDs suffer from a shifted perspective of the real-world because the scene cameras are mounted anterior (in front of), superior (above), and/or lateral (to the side) of the user's eyes. Scene cameras placed lateral to the eyes create a mismatch in Inter-pupillary distance (IPD) compared to the user's eyes. As a result, the user can suffer from double vision, blurred vision, dizziness, headache, nausea, and fatigue. This mismatch can also result in the incorrect perceived distance, and scale, of objects. Scene cameras placed superior or anterior to the eyes can create a perspective that translates with exaggeration to head movement, or incorrect motion parallax. These effects can also cause the user discomfort.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts describe a novel thin lens system. The claimed lens system includes a first plurality of lens elements arranged along a first specified surface (e.g., a spherical or flat contour) and configured to act as a first compound lens having a first compound lens viewpoint and a first compound lens field-of-view (FOV), the first plurality of lens elements configured to collect light from a scene, wherein each lens elements includes: a lens (compound or simple) having an object-side surface configured to face the scene and an image-side surface antipodal to the object-side surface; an image sensor located on the image-side surface side of the lens and separate therefrom, the image sensor having a back surface facing away from the image-side surface of the lens; an aperture stop located between the image-side surface of the lens and the image sensor; and an entrance pupil located behind the back surface side of the image sensor and separate therefrom. In some embodiments, the aperture stop may be located on a lenses object-side surface, within the lens itself, on the lenses image-side surface, or behind the lens (i.e., between a lenses image-side surface and the corresponding image sensor). In other embodiments, the first plurality of lens elements are configured so that their entrance pupils intersect in a first region that coincides with the first compound lens viewpoint. In yet other embodiments, each of the first plurality of lens elements may be configured so that the FOV of immediately adjacent lens elements only partially overlap. In still other embodiments, one or more of the lens elements may have a corresponding display element and be configured so that each display element displays at least some of the scene as imaged by the corresponding image sensor. In one embodiment, the first plurality of lens elements may be held in fixed spatial relation with one another by a structure that may be mounted on a user's head. In another embodiment, the first plurality of lens elements may be held in fixed spatial relation with one another by structure inherent in a hand-held electronic device. Illustrative electronic devices include, but are not limited to, a video see-through head-mounted unit, a tablet computer system, a notebook computer system and a mobile telephone. In one or more embodiments, the novel lens system can include a second plurality of lens elements arranged along a second specified surface and configured to act as a second compound lens having a second compound lens viewpoint and a second compound lens field-of-view (FOV), the second plurality of lens elements configured to collect light from the scene, wherein each of the second plurality of lens elements has: a lens having an object-side surface configured to face the scene and an image-side surface antipodal to the object-side surface; an image sensor located on the image-side surface side of the lens and separate therefrom, the image sensor having a back surface facing away from the image-side surface; an aperture stop located between the image-side surface and the image sensor; and an entrance pupil located behind the back surface of the image sensor and away from the image-side surface. As with the first plurality of lens elements, one or more of the second plurality of lens elements may include a compound lens, have minimally overlapping FOV, and have a corresponding display element.

BRIEF DESCRIPTION OF THE DRAWINGS

FIG. 8 shows, in flowchart form, an augmented reality processing operation in accordance with one or more embodiments.

DETAILED DESCRIPTION

Figure 1:
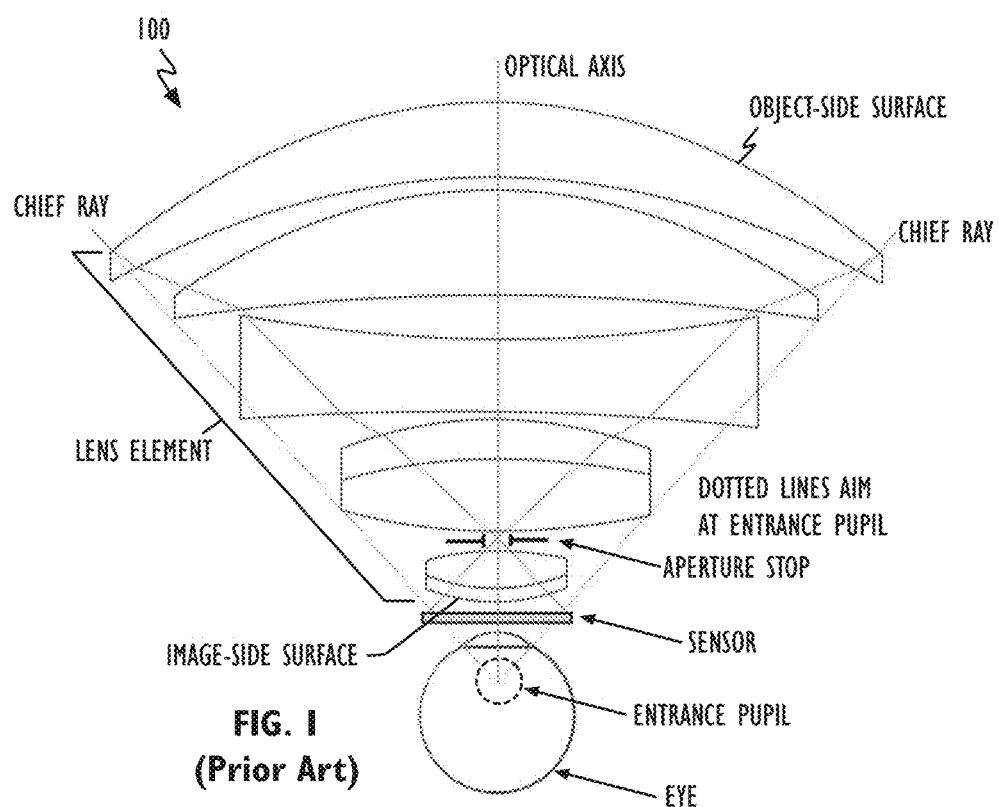
FIG. 1 shows the configuration of a conventional camera system for use in a VR system in accordance with the prior art.

This disclosure describes a novel lens system having an entrance pupil at a location matching, or nearly matching, the eye's optical system entrance pupil. The described lens system is significantly thinner than a conventional lens system making it well-suited to head-mounted device (HMD) applications. The system's thinness is achieved by using an array of camera elements. Each camera element containing camera optics called "lenslets" and a sensor (e.g., the sensor could be an image sensor or a depth sensor), where a lenslet can include one or more lenses (e.g., a compound lens). Individual camera elements can be arranged such that their optical axes intersect at, or near, the eye's entrance pupil location. In addition, each camera element's field-of-view (FOV) corresponds to a small sector of a large FOV. The FOVs of adjacent camera elements can be non- or slightly-overlapping so that a wide-angle image can be formed by concatenation of the individual camera element images.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of optical systems having the benefit of this disclosure.

Referring to FIG. 1, lens system 100 proving a perspective matching the eye includes lens element 105 having object-side surface 110 (the surface facing the object or scene being viewed), image side surface 115, aperture stop 120 and sensor 125. As used herein:

A "chief ray" 130 is a ray from an off-axis point in the object being observed that passes through the center of the lens system's aperture stop 120. Every "point" in the scene has a corresponding chief ray.

A special chief ray that passes through the center of the object's X-Y plane and the center of the lens system's aperture stop is called the "optical axis" 135.

The "entrance pupil" 140 is an image (in 3-D space) of the lens system's aperture 120 as seen through the object-side surface 110 of lens element 105. In an ideal lens, chief rays 130 pass through the center of entrance pupil 140. The position of the entrance pupil 140 defines the "perspective point" or "view point" of the lens system 100.

In the case of a video see-through HMD, the camera is required to be located several centimeters from the eye due to the eyepiece and display optics. In addition the camera is preferably wide-angle to match the wide field-of-view (FOV) of the eye. A conventional camera lens proving these capabilities (see FIG. 1) would need to be very wide to collect wide-angle chief rays that correspond to the eye. Likewise, conventional lens SYSTEM 100 would need to be very thick to bend rays toward a sensor with minimal aberration. In practice, such a camera is not feasible for lightweight HMDs because of lens size.

Figure 2:
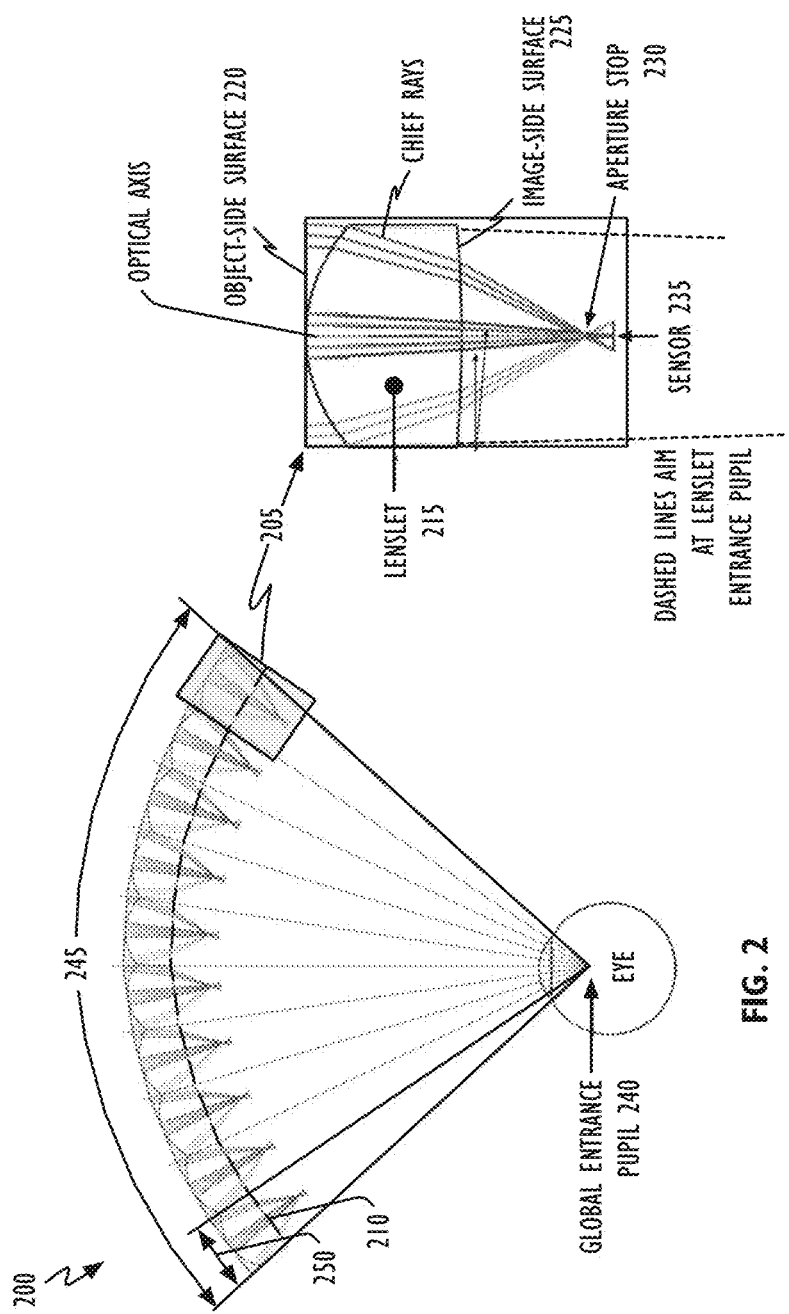
FIG. 2 illustrates a camera system having its individual elements arranged along a spherical surface in accordance with one or more embodiments.

Referring to FIG. 2, in one or more embodiments compound lens system 200 has its individual elements (e.g., camera element 205) arranged along spherical surface 210. Each camera element 205 can include one or more optical elements or lenslets 215 (each having an object-side surface 220 and an image-side surface 225), aperture stop 230 and sensor 235. In one particular embodiment, all camera elements are identical and share the same global entrance pupil 240 center position. As used herein, the "global entrance pupil" of a compound lens system is a region of minimum volume that contains all camera/lens element entrance pupils. The positioning of each lenslet's entrance pupil at a distance of multiple centimeters (cm) away from the lenslet itself can be achieved by positioning stop 230 such that the lenslet's entrance pupil is equal to, or approximately equal to, the desired global entrance pupil 240. It has been found that aperture stop 230 can be on the lenses object-side surface 220, between the lenses object-side and image-side surfaces (220 and 225 respectively) or between image-side surface 225 and image sensor 235 and still result in an entrance pupil behind image sensor 235.

Using first-order optical principals, the relationship between a lenslet's entrance pupil distance ($s_{ep}$) and its stop ($s_{stop}$) is described by:

$$\frac{1}{s_{stop}} = \frac{1}{f} + \frac{1}{s_{ep}},$$

where $s_{stop}$ represents the lenslet's aperture stop, $s_{ep}$ represents a lenslet's positive distance between the compound lens' global entrance pupil and the lenslet's principal plane, and f is the lenslet's focal length. In practice, the value $s_{stop}$ has to be smaller than the imaging distance of the lenslet. In this configuration, lens system 200 has an effective or compound FOV 245 that is the aggregate of each lens element's individual FOV (e.g., element FOV 250), where each small FOV (e.g., FOV 250) is manifest through the use of small, thin optics. This approach permits the realization of thin/light lens systems with significant FOVs. It should be noted that while lenslet 215 has been shown as a single element, it may in fact comprise a number of different lenses and may further include other optical elements such as mirrors, diffractive surfaces, holograms, and/or prisms; such lenses referred to herein as "compound" lenses.

Figure 3:
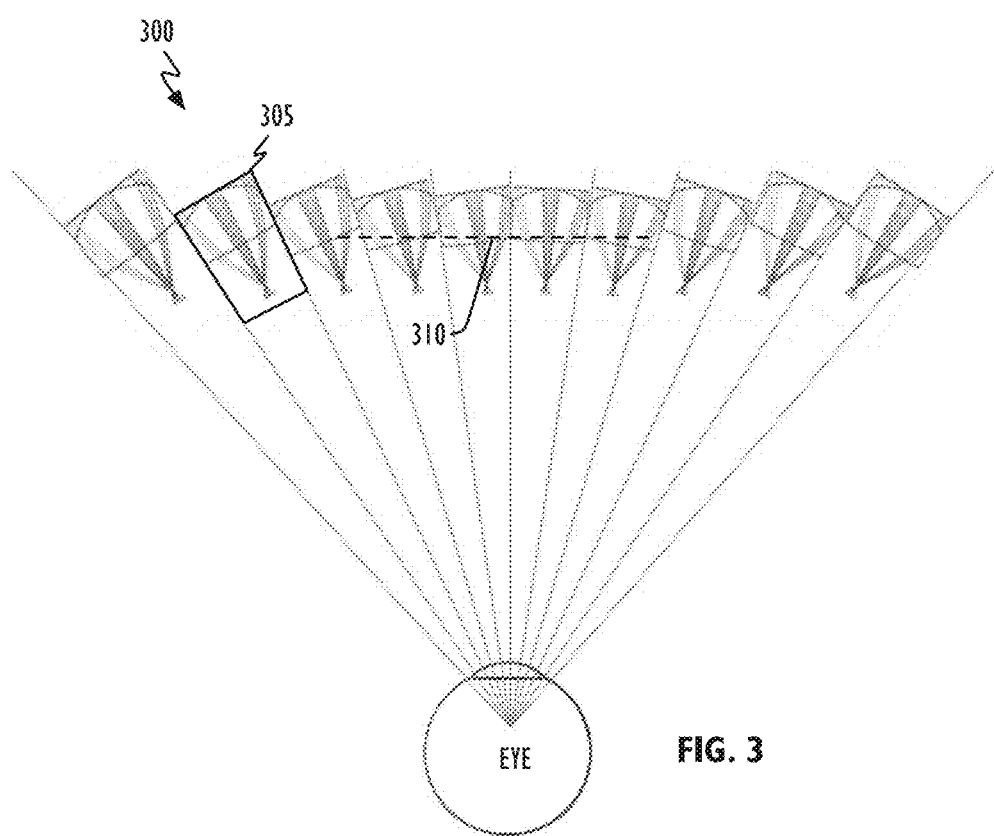
FIG. 3 illustrates a camera system having its individual elements arranged along a non-spherical surface in accordance with another one or more embodiments.

Referring to FIG. 3, compound lens system 300 in accordance with one or more other embodiments can have its individual elements (e.g., camera element 305) arranged on a non-spherical surface (e.g., planar surface 310). Depending on individual camera element positions and lenslet design, the lenslets' entrance pupils and global entrance pupil can change position and magnification. These changes correspond to image distortion, also referred to as "lens projection." A system in accordance with this disclosure can be designed for a particular lens projection.

In accordance with this disclosure, camera elements may be identical or different. For example, the lenslet curvature, thickness, number of elements, or aperture stop size and position can be unique for each camera element; thereby allowing each lenslet's entrance pupil to be positioned at a different three-dimensional (3D) location. This permits each lenslet's entrance pupil to be gradually shifted from the eye with increasing off-axis field-location, or to have a fixed offset from the eye's entrance pupil location. To mitigate the unwanted physiological reactions noted above (e.g., double vision, blurred vision, dizziness, headache, nausea, and fatigue), each lenslet's entrance pupil location should coincide with the global entrance pupil. As used herein, the term "coincides" means a lenslet's entrance pupil falls within—or is close enough to—the region defined by the compound lens's global entrance pupil so as to mitigate the aforementioned unwanted physiological effects. In one or more embodiments for example, the compound lens's global entrance pupil can be a region approximately spherical with a radius of less than 2 cm. Said differently, a lenslet's entrance pupil should fall within approximately 2 cm of the user's eye (e.g., when the compound lens system is worn by a user).

Figure 4:
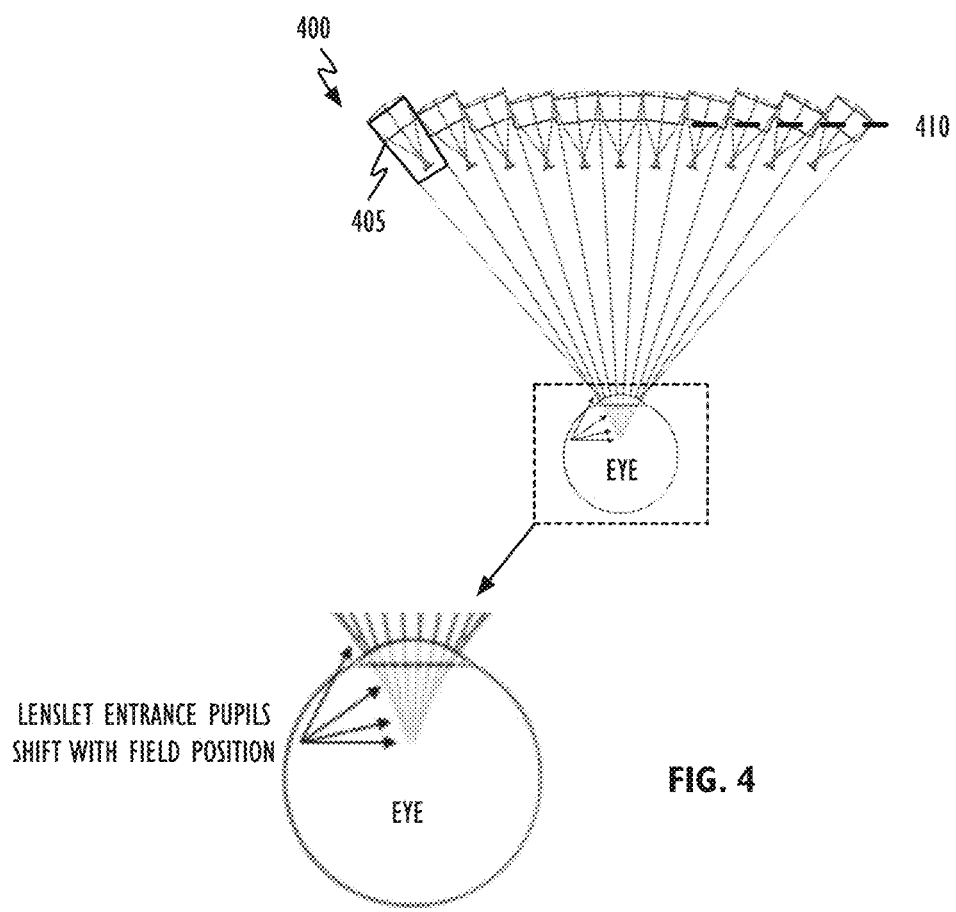
FIG. 4 illustrates yet another camera system having its individual elements arranged along a planar surface in accordance with this disclosure.

Referring to FIG. 4, if a compound lens system's individual elements (e.g., camera element 405) are arranged on planar surface 410 and have identical design, the individual camera element's entrance pupil can slowly shift from the eye. In this design, the optical axis of each camera element or lenslet also slowly shifts from the eye. The behavior of this shift is analogous to how the pupil shifts in a traditional "fisheye" lens. In this configuration, all chief rays from the scene are collected by camera system 400.

Figure 5:
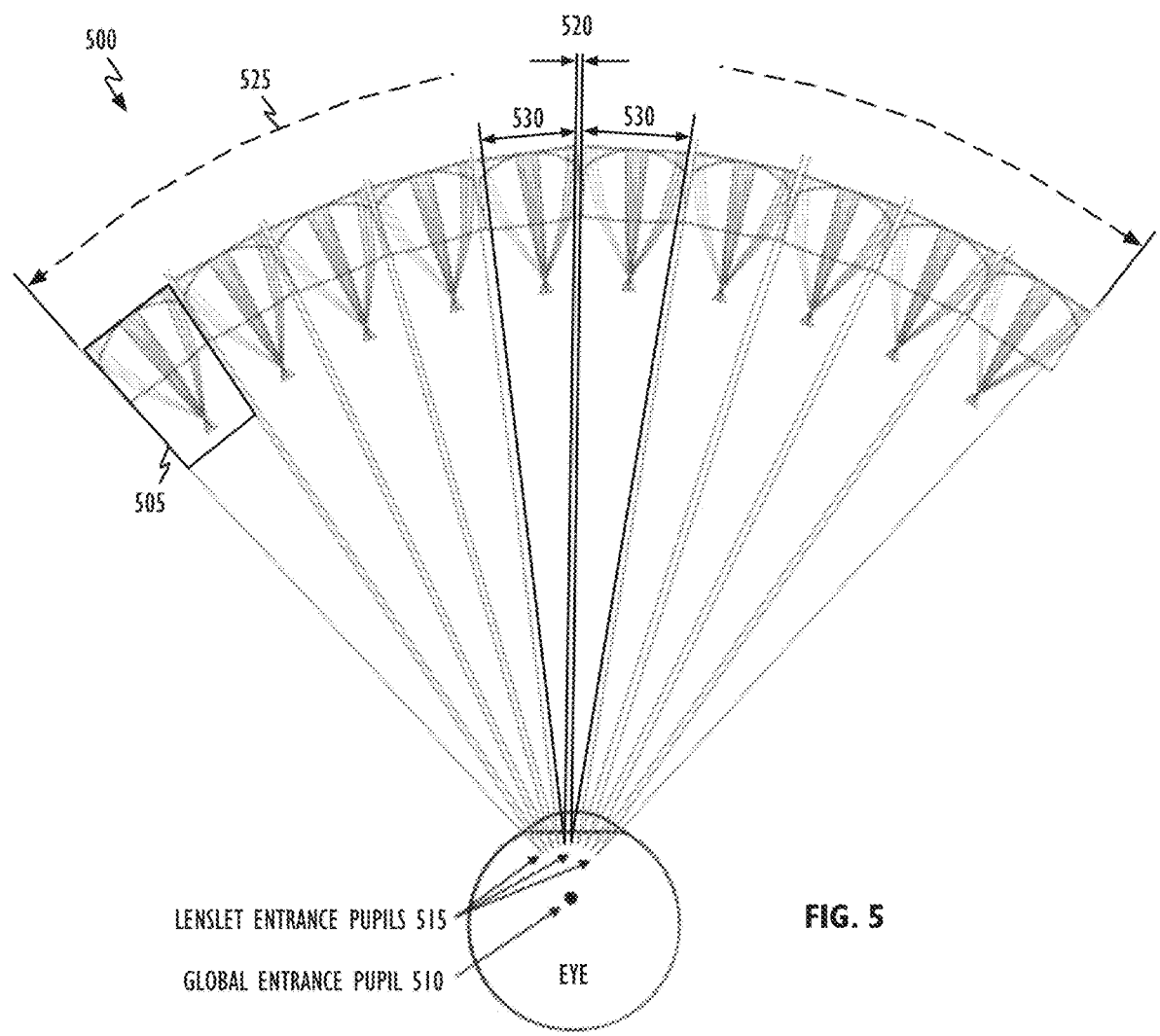
FIG. 5 illustrates still another camera system in accordance with one or more embodiments.

Referring to FIG. 5, if camera elements (e.g., 505) have identically designed camera elements with their optical axis intersecting the eye, but do not share the same entrance pupil center location (that is, global entrance pupil 510 does not coincide with individual lenslet entrance pupils 515), there will be "gaps" 520 or missing information from FOV 525 for compound lens system 500. (Again, compound FOV 525 is the aggregate of individual element FOVs such as 530.) The size of the gaps 520 correspond to the offset of the local or lenslet entrance pupil center 515 from the global entrance pupil center 510. The gap can have a constant width. Such a camera array design (aka, compound lens system 500) can be used to reduce lenslet size and/or reduce vignetting. It may be noted that gaps 520 can result in stitching errors when images from individual camera elements 505 are stitched together. To avoid this, the individual camera elements may be calibrated so that images from adjacent elements "just touch" or slightly overlap. That is, immediately adjacent camera element's FOV may be adjusted to overlap just a little so that a single view—without gaps—may be displayed. In another embodiment, the FOVs of adjacent camera elements may overlap less than 5% to 50% with immediately adjacent camera elements. Again, if camera elements 505 are adjusted so that lenslet entrance pupils 515 coincide with the eye pupil (e.g., are within 2 cm), the aforementioned physiological problems associated with IPD mismatch and motion parallax may be significantly mitigated.

Figure 6A:
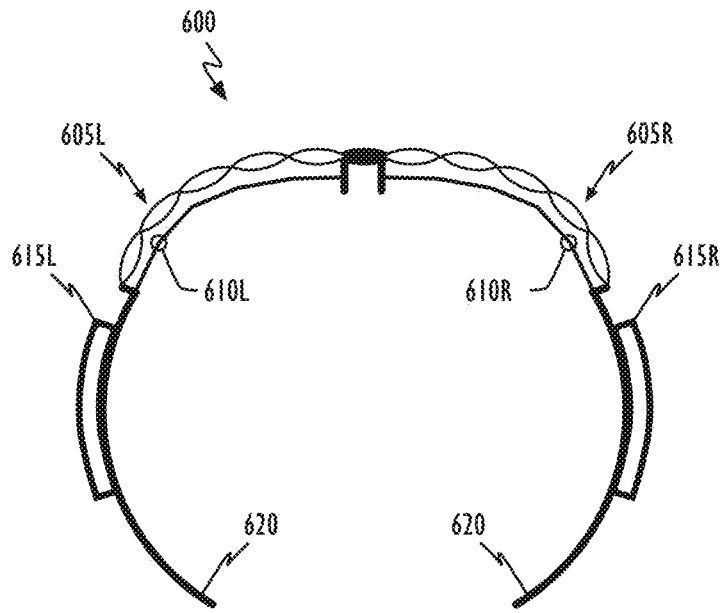
FIGS. 6A-6B show, in block diagram form, augmented reality head mounted systems in accordance with various embodiments.
Figure 6B:
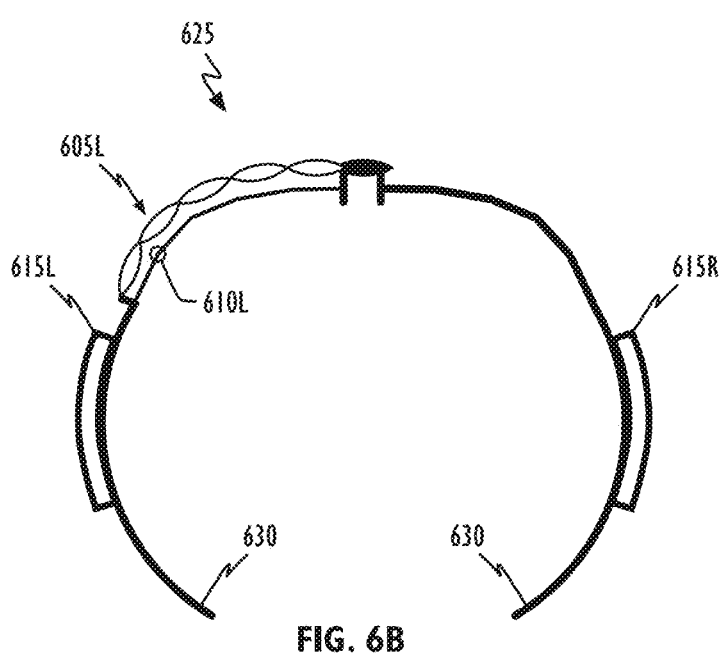

While camera systems in accordance with this disclosure are not limited to use in head-mounted devices (HMD), they may be particularly useful in same because they can be fabricated to be slimmer and less bulky than conventional HMD systems. Referring to FIG. 6A, augmented reality (AR) HMD system 600 in accordance with one or more embodiments includes multiple camera elements (represented by ⬡ shaped elements) for each eye (e.g., 605L and 605R) arranged along a spherical surface, one or more display elements 610L and 610R, one or more modules 615L and 615R and structure 620 to which the other components may be affixed and which can be mounted onto a user's head. While only 5 camera elements are illustrated for each eye, more or fewer may be used in any given implementation depending upon the device's intended use and targeted FOV. As a general rule, camera elements 605L and 605R need not include equal numbers of camera units, nor do the surfaces on which each of 605L and 605R reside need be the same. The camera elements 605L and 605R, may each be associated with a viewpoint for each eye, which may enable stereo vision with correct perspective, according to one or more embodiments. In some embodiments, camera elements 605 may include CCD (charge-coupled device) or CMOS (complementary metal-oxide semiconductor) imaging sensors. In yet other embodiments, each camera element may include one sensor (e.g., see FIG. 2). In other embodiments, camera elements 605 may include depth sensors. In one embodiment, there may be a separate display element 610 corresponding to each camera element 605. In another embodiment, two or more camera elements may share a common display element (e.g., different portions of a single sensor substrate). In some embodiments, display elements 610 may be constructed from standard dynamic range (SDR) or high dynamic range (HDR) display technology including, without limitation, liquid crystal displays (LCDs) and Organic Light Emitting Diode (OLED) displays. Modules 615 can include, for example, batteries, processor circuitry, memory and communication circuitry. Processor circuitry (e.g., one or more processors, including graphics processing units) can be used to perform operations associated with AR implementations such as image acquisition, object detection, stitching together images from different camera elements and for interjecting AR data onto display elements 610. Memory can be used for the acquisition and storage of images and computer program instructions (see discussion below with respect to FIG. 9). Communication circuitry can allow AR-HMD system 600 to communicate with an associated computer system (see discussion below). In one embodiment, this communication could be used if AR-HMD system 600 does not have sufficient computational power to acquire, process and display the acquired scene data with AR data included therein. That is, communication circuitry can be used to obtain processing support not available in AR-HMD 600 itself. In general, elements such as camera elements (605l and/or 605R), display elements (610l and/or 610R) and modules (615l and/or 615R) need not be affixed directly to structure 620. Referring to FIG. 6B, in another embodiment AR-HMD system 625 includes optic and electronic systems (605l, 610l, and modules 615) affixed to structure 630 for only a single eye. In the illustrated system, electronic modules 615l and 615R are shown although both may not be necessary.

Figure 7A:
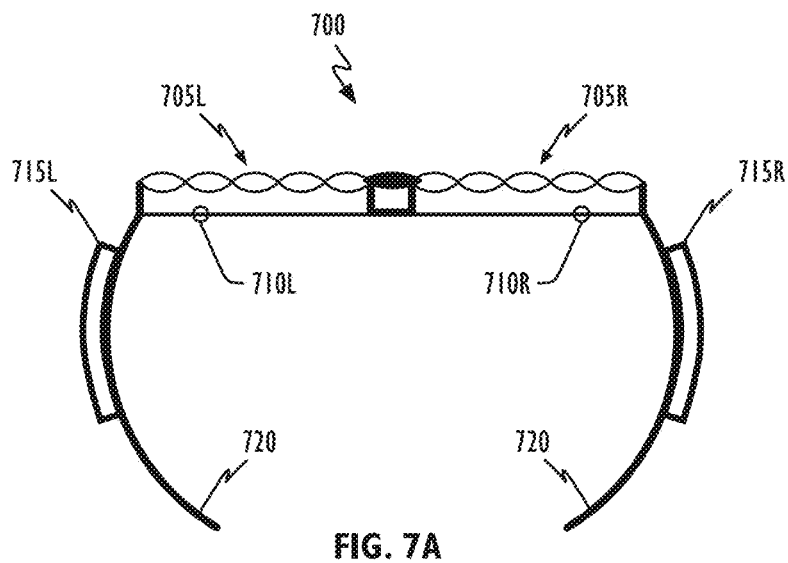
FIGS. 7A-7B show, in block diagram form, augmented reality head mounted systems in accordance with one or more different embodiments.
Figure 7B:
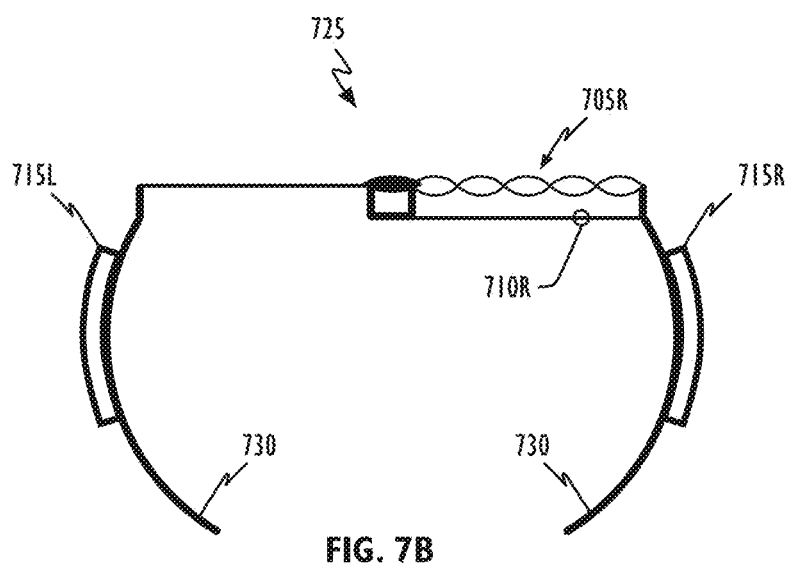

Referring to FIG. 7A, AR-HMD system 700 in accordance with one or more additional embodiments includes multiple camera elements (again represented by ⌢ shaped elements) for each eye (e.g., 705I and 705R) arranged along a non-spherical surface, one or more display elements 710I and 710R, one or more modules 715I and 715R and structure 720 to which the other components may be affixed (directly or indirectly) and which, as above, can be mounted onto a user's head. Referring now to FIG. 7B, AR-HMD system 725 is a single-eye system in accordance with one or more embodiments similar in nature to FIG. 6B except that 705R is arranged along a non-spherical surface. Elements in FIGS. 7A and 7B can serve the same function as similarly named components described above with respect to AR-HMD system 600.

Referring to FIG. 8, AR operation 800 in accordance with one or more embodiments begins by collecting light received from a (real-world) scene through camera elements (e.g., 205, 305, 405, 505, 605 and 705) as described herein (block 805). The captured light may be focused onto sensors (e.g., sensor 235 within camera element 205) and the resulting temporal sequence of images captured (block 810) and processed (block 815). In some embodiments, images may be processed to identify known objects (e.g., buildings, automobiles, signs and people). In one embodiment, information such as location information from a GPS unit part of, or in communication with, the AR system may be used to determine if an identified building is a specific identified building (e.g., the Empire State building). In another embodiment facial recognition technology may be used to identify a specific person(s). Based on information obtained or generated during image analysis operations, additional information may be determined (e.g., the name "Empire State building" or "John Smith"), referred to herein as "augmented information" (block 820). An image may be generated (block 825) based on the acquired image and the augmented information and displayed via the AR system's display elements such as display elements 610 and 710 (block 830). In one or more embodiments, AR operation 800 may be performed by an AR-HMD such as device 600, 625, 700 or 725. In another one or more embodiments, AR operation 800 may be performed by an electronic device such as a mobile telephone having camera elements as disclosed herein mounted in, on or to the phone.

While not limited to HMD-type implementations, AR-HMDs employing camera elements or using lenslets in accordance with this disclosure (e.g., as illustrated in FIGS. 2-7), can reduce the mismatch between a user's Interpupillary distance (IPD) and the difference between each camera system's viewpoint (e.g., global entrance pupil). By so doing, AR-HMDs in accordance with this disclosure can reduce or eliminate the double or blurred vision, dizziness, headache, nausea, and fatigue prevalent in prior art AR-HMDs. Lens systems as described herein and AR-HMDs using same, can also improve the perceived distance and scale of viewed objects, translate viewed objects with appropriate scale in response to head movement, and reduce motion parallax.

Figure 9:
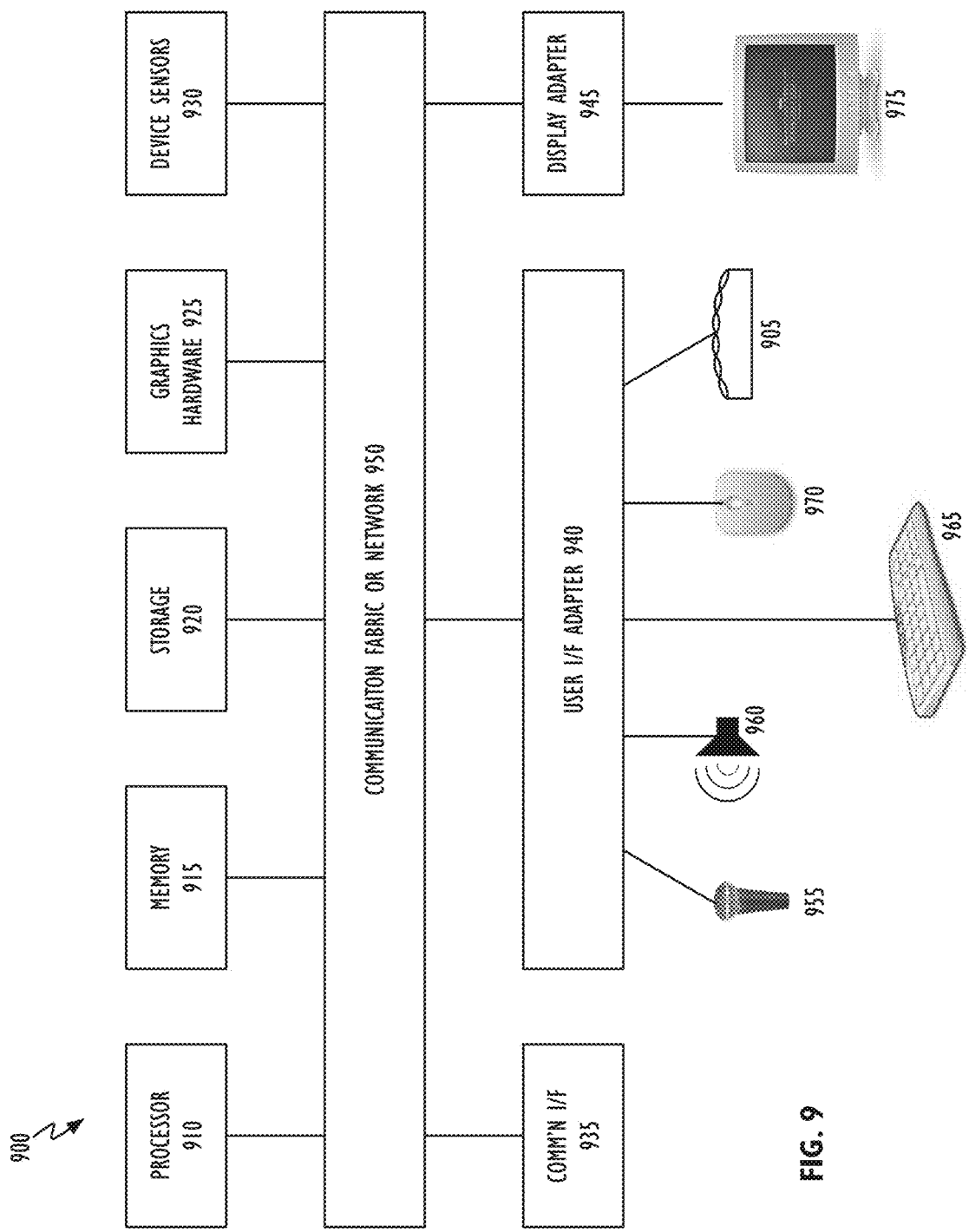
FIG. 9 shows, in block diagram form, a computer system in accordance with one or more embodiments.

Referring to FIG. 9, computer system 900 may interface to and process data from augmented reality component 905 in accordance with this disclosure. By way of example, AR component 905 could be one of devices 600, 625, 700, 725 or an electronic device as discussed above. Also by way of example, computer system 900 can be a general purpose computer system such as a desktop, laptop, notebook or tablet computer system. In other implementations, computer system 900 could be a special-purpose computer system such as a dedicated workstation or AR system (embedded within modules 615 or 715). Computer system 900 may include processor element or module 910, memory 915, one or more storage devices 920, graphics hardware element or module 925, device sensors 930, communication interface module or circuit 935, user interface adapter 940 and display adapter 945—all of which may be coupled via system bus, backplane, fabric or network 950 which may be comprised of one or more switches or one or more continuous or discontinuous communication links. When coupled to AR component 905, computer system 900 may provide computational support and/or the data necessary or beneficial for AR presentations and power to AR component 905. For example, computer system 900 could supply data that is overlaid on the presentation of the physical world (e.g., obtained through camera elements 205, 305, 405, 505, 605, and 705). In another embodiment, computer system 900 could provide different or additional computational support such as object identification, image alignment and image stitching.

Processor module 910 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 910 may be a single processor element, a system-on-chip, an encapsulated collection of integrated circuits (ICs), or a collection of ICs affixed to one or more substrates. Memory 915 may include one or more different types of media (typically solid-state) used by processor module 910 and graphics hardware 925. For example, memory 915 may include memory cache, read-only memory (ROM), and/or random access memory (RAM). Storage 920 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 915 and storage 920 may be used to retain media (e.g., audio, image and video files), preference information, device profile information, frameworks or libraries, computer program instructions or code organized into one or more modules and written in any desired computer programming language, and any other suitable data. When executed by processor module 910 and/or graphics hardware 925 such computer program code may interface with AR component 905 to perform as disclosed herein. Graphics hardware 925 may be special purpose computational hardware for processing graphics and/or assisting processor module 910 perform computational tasks. In one embodiment, graphics hardware 925 may include one or more GPUs, and/or one or more programmable GPUs and each such unit may include one or more processing cores. In another embodiment, graphics hardware 925 may include one or more custom designed graphics engines or pipelines. Such engines or pipelines may be driven, at least in part, through software or firmware. Device sensors 930 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a magnetometer, a thermistor, an electrostatic sensor, a temperature or heat sensor, a pixel array and a momentum sensor. Communication interface 935 may be used to connect computer system 900 to one or more networks or other devices. Illustrative networks include, but are not limited to, a local network such as a USB network, an organization's local area network, and a wide area network such as the Internet. Communication interface 935 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 940 may be used to connect microphone 955, speaker 960, keyboard 965, pointer device 970, and other user interface devices such as AR component 905. Display adapter 945 may be used to connect one or more display units 975 which may provide touch input capability. In other embodiments, AR component 905 may be coupled to computer system 900 through communication interface 935 (wired or wireless). In still other embodiments, AR component 905 may include sufficient computational power that separate computer system 900 is not needed. In yet another embodiment, computer system 900 (sans AR component 905) may be part of a more complete AR device such as, for example, AR-HMD 600 or 700.

In one or more embodiments AR component 905 may include multiple camera elements (e.g., camera element 205) embedded or configured to be part of computer system 900. In such embodiments, the images captured by component 900 may be stored (e.g., to memory 915 and/or storage 920) for presentation on a headset such as headsets 600, 625, 700 and 725. In accordance with this disclosure, content capture (e.g., by AR component 905) may be separate from content presentation or display (e.g., via display elements 610 and 710). In one embodiment, images captured via component 905 may be processed in real-time or near-real-time and displayed. In another embodiment, images captured via component 905 may be processed in real-time or near-real-time and stored for later display. In yet another embodiment, images captured via component 905 may be stored for later processing and display.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of elements shown in FIGS. 2-9 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A lens system, comprising:
a first plurality of lens elements arranged along a first specified surface of a head-mounted device and configured to act as a first compound lens having a first compound lens viewpoint, a first compound lens field-of-view (FOV), and a global entrance pupil, the first plurality of lens elements configured to collect light from a scene, wherein each of the first plurality of lens elements has—
a lens having an object-side surface configured to face the scene and an image-side surface antipodal to the object-side surface;
an image sensor located on a same side as the image-side surface of the lens and separate therefrom, the image sensor having a back surface facing away from the image-side surface,
an aperture stop located between the object-side surface and the image sensor, and
an entrance pupil located behind the back surface of the image sensor and separate therefrom,
wherein the entrance pupil for each of the plurality of lens elements intersect in a region that coincides with the compound lens viewpoint, and
wherein the plurality of lenses is incorporated into the head mounted device such that the global entrance pupil coincides with an eye of a user.

2. The lens system of claim 1, wherein at least one of the lens elements comprises two or more lenses.

3. The lens system of claim 1, wherein the aperture stop is located between the image-side surface and the image sensor.

4. The lens system of claim 1, wherein each of the first plurality of lens elements are configured so that their entrance pupils intersect in a first region, wherein the first region coincides with the first compound lens viewpoint.

5. The lens system of claim 1, further comprising a first structure configured to keep each lens element of the first plurality of lens elements in fixed spatial relationship with one another.

6. The lens system of claim 1, further comprising a first display element associated with the first plurality of lens elements, the first display element configured to display at least a portion of the scene as captured by an image sensor of the first lens element.

7. The lens system of claim 5, wherein the first structure is further configured to mount on, or affix to, a user's head.

8. The lens system of claim 1, wherein the first specified surface comprises a spherical surface.

9. The lens system of claim 1, wherein a field of view ("FOV") of each lens element is configured to only partially overlap the FOV of each immediately adjacent lens element.

10. The lens system of claim 1, wherein the first compound lens viewpoint is at least 10 millimeters displaced from a back surface of the image sensor and away from the image-side surface.

11. The lens system of claim 1, wherein the first plurality of lens elements are incorporated in a portable electronic device.

12. The lens system of claim 11, wherein the portable electronic device comprises one of a tablet computer system, a notebook computer system and a mobile telephone.

13. The lens system of claim 1 further comprising a second plurality of lens elements arranged along a second specified surface and configured to act as a second compound lens having a second compound lens viewpoint and a second compound lens field-of-view (FOV), the second plurality of lens elements configured to collect light from the scene, wherein each of the second plurality of lens elements has—
a lens having an object-side surface configured to face the scene and an image-side surface antipodal to the object-side surface;
an image sensor located on the same side as the image-side surface of the lens and separate therefrom, the image sensor having a back surface facing away from the image-side surface;

an aperture stop located between the object-side surface and the image sensor; and an entrance pupil located behind the back surface of the image sensor and away from the image-side surface.

14. The lens system of claim 13, wherein at least one of the second plurality of lens elements comprises a compound lens.

15. The lens system of claim 13, wherein each of the second plurality of lens elements are configured so that their entrance pupils intersect in a second region, wherein the second region coincides with the second compound lens viewpoint.

16. The lens system of claim 15, wherein a field of view ("FOV") of each of the second plurality of lens elements is configured to only partially overlap the FOV of each immediately adjacent lens element.

17. The lens system of claim 13, further comprising a second display element associated with the second plurality of lens elements, the second display element configured to display at least a portion of the scene as captured by an image sensor of the second lens element.

18. The lens system of claim 13, further comprising a first structure configured to keep each lens element of the first plurality of lens elements in fixed spatial relationship with one another and each lens element of the second plurality of lens elements in fixed spatial relationship with one another.

19. An electronic device comprising:

memory;

a display element communicatively coupled to the memory;

a first plurality of lens elements arranged along a first specified surface of a head-mounted device and configured to act as a first compound lens having a first compound lens viewpoint and a first compound lens field-of-view (FOV), and a global entrance pupil, the first plurality of lens elements configured to collect light from a scene, wherein each of the first plurality of lens elements has— a lens having an object-side surface configured to face the scene and an image-side surface antipodal to the object-side surface, an image sensor located on a same side as the image-side surface of the lens, the image sensor having a back surface facing away from the image-side surface, wherein the image sensor is optically coupled to the lens and communicatively coupled to the memory;

an aperture stop located between the object-side surface and the image sensor, and an entrance pupil located behind a same side as the back surface of the image sensor and separate therefrom, wherein the entrance pupil for each of the plurality of lens elements intersect in a region that coincides with the compound lens viewpoint, and wherein the plurality of lenses is incorporated into the head mounted device such that the global entrance pupil coincides with an eye of a user; and a structure configured to keep each of the first plurality of lens elements in fixed spatial relationship with one another.

20. The electronic device of claim 19, further comprising one or more processors communicatively coupled to the memory, the display element and a first plurality of image sensors, the one or more processors configured to execute instructions stored in the memory to cause the one or more processors to:

capture a first plurality of images of the scene by the first plurality of sensors, each of the first plurality of images stored in the memory;

process at least some of the first plurality of images to identify an object therein;

determine secondary information based on the identified object;

generate an output image by visually combining at least some of the first plurality of images and the secondary information; and display the output image on the display element.

21. The electronic device of claim 19, wherein the display element comprises a plurality of display elements.

22. The electronic device of claim 21, wherein each of the first plurality of lens elements has a corresponding display element.

23. The lens system of claim 1, wherein the first specified surface is a non-spherical surface, and wherein the first plurality of lens elements are arranged along the first specified surface for a predetermined lens projection of the compound lens.

\* \* \* \* \*